(12) United States Patent
Han et al.

(10) Patent No.: US 9,411,356 B2
(45) Date of Patent: Aug. 9, 2016

(54) APPARATUS AND METHOD FOR COLLECTING POWER FROM DISTRIBUTED POWER SUPPLY RESOURCES (71) Applicants: Samsung Electronics Co. Ltd., Suwon-si, Gyeonggi-do (KR); SEOUL NATIONAL UNIVERSITY R&DB FOUNDATION, Seoul (KR)

(72) Inventors: Se-Hee Han, Seoul (KR); Joo-Yeol Lee, Seongnam-si (KR); Yong-Tae Yoon, Seoul (KR); Young-Gyu Jin, Seoul (KR); Hyeong-Ig Kim, Seoul (KR); Si-Young Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 511 days.

(21) Appl. No.: 13/853,503

(22) Filed: Mar. 29, 2013

(65) Prior Publication Data
US 2013/0261830 A1 Oct. 3, 2013

(30) Foreign Application Priority Data

Mar. 30, 2012 (KR) .................. 10-2012-0033449

(51) Int. Cl.
G05F 5/00 (2006.01)
H02J 1/00 (2006.01)
(Continued)

(52) U.S. Cl.
CPC ............... *G05F 5/00* (2013.01); *B60L 11/1816* (2013.01); *B60L 11/1844* (2013.01); *B60L 11/1846* (2013.01); *H02J 1/00* (2013.01); *H02J 3/00* (2013.01); *H02J 3/382* (2013.01); *B60L 2240/80* (2013.01); *B60L 2250/14* (2013.01); *H02J 2003/007* (2013.01); *Y02E 60/721* (2013.01); *Y02T 10/7005* (2013.01); *Y02T 10/7072* (2013.01); *Y02T 10/7094* (2013.01);
(Continued)

(58) Field of Classification Search
CPC ..... G05F 5/00; B60L 11/1846; B60L 11/1816; B60L 11/1884
USPC ....................................... 700/295
See application file for complete search history.

(56) References Cited

U.S. PATENT DOCUMENTS 8,352,095 B2 * 1/2013 Kim .............. G06Q 50/06
700/291
2008/0179959 A1 7/2008 Folken et al.
(Continued)

FOREIGN PATENT DOCUMENTS

JP 2006-318135 A 11/2006
JP 2007-166855 A 6/2007
KR 10-2011-0033035 A 3/2011
(Continued)

*Primary Examiner* — Mohammad Ali
*Assistant Examiner* — Sheela S Rao
(74) *Attorney, Agent, or Firm* — Jefferson IP Law, LLP (57) ABSTRACT An apparatus and method for collecting power from distributed power supply resources are provided. The method includes transmitting a signal for inquiring whether supply of demand-side power supply resources is possible to a providing side that provides demand-side power supply resources, selecting demand-side power supply resources to be utilized, based on power supply resource-related information for each of available demand-side power supply resources, which is received from the providing side, and notifying the selection results to the selected demand-side power supply resources.

20 Claims, 4 Drawing Sheets (51) Int. Cl.
*H02J 3/00* (2006.01)
*H02J 3/38* (2006.01)
*B60L 11/18* (2006.01)

(52) U.S. Cl.
CPC .............. *Y02T90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

2011/0054709 A1 3/2011 Son
2011/0071699 A1 3/2011 Kim et al.

FOREIGN PATENT DOCUMENTS

WO 2008/125697 A2 10/2008

\* cited by examiner

APPARATUS AND METHOD FOR COLLECTING POWER FROM DISTRIBUTED POWER SUPPLY RESOURCES

PRIORITY

This application claims the benefit under 35 U.S.C. §119(a) of a Korean patent application filed on Mar. 30, 2012 in the Korean Intellectual Property Office and assigned Serial No. 10-2012-0033449, the entire disclosure of which is hereby incorporated by reference.

BACKGROUND OF THE INVENTION

1. Field of the Invention

The present invention relates to an apparatus and method for controlling power. More specifically, the present invention relates to an apparatus and method for distributing power or electricity corresponding to the required power demand from distributed power supply apparatuses.

2. Description of the Related Art

General power systems are operated so that the supply power may be adjusted to correspond to the power demand. For this purpose, various power supply control techniques, such as power demand forecasting, economic load dispatch and automatic load dispatching control, have been designed and used.

Power supply systems, also known as generators, are generally built on a large scale in consideration of economies of scale, and the reliability and cost savings are considered as a primary operating criteria. In recent years, however, the demand for power has surged and the type of power load has significantly changed from linear loads, which are proportional to frequency, to nonlinear loads such as digital devices. In addition, it is difficult to build a typical large-scale power generation system due to concerns such as site selection and investment risk. Owing to these situations, interest in the role of the demand side has increased when considering matching the demand and supply of power and operating the power systems reliably.

The general demand-side power supply resources include, for example, renewable energy resources and demand response resources which can be acquired through power storage apparatuses and electric cars. These demand response resources may be acquired through the apparatuses that can adjust power usage, such as smart appliances. The renewable energy resources refer to solar or wind power generation apparatuses which are installed on a small scale at homes or local areas. The power storage apparatus refers to an apparatus that can store power in advance and supply the stored power if necessary, such as a battery. The electric car is similar to the power storage apparatus in the principle of operation since it basically uses a battery, but the electric car is distinguishable from the power storage apparatus installed in a fixed position since it additionally has mobility. Apparatuses that can provide these demand-side power supply resources may match the demand and supply of power in the power system in a manner of reducing the power usage if the power system lacks available supply power, and increasing the power usage if the power is oversupplied from the power system.

For example, if the units of the demand-side power supply resources are assumed to be a home or a small area, they are characterized by a large number, diversity, small scale, dispersion and the like. These characteristics make it difficult to utilize the demand-side power supply resources. More specifically, the existing large-scale power generation systems can directly control generators using various power supply control techniques. However, it is difficult for the demand-side power supply resources to apply the existing power supply control techniques since a plurality of various resources are distributed on a small scale. In addition, direct control by a single object is practically impossible. Therefore, there is a need for useful measures that can practically make application of the demand-side power supply resources possible, by addressing control problems caused by the characteristics of the demand-side power supply resources, such as the large number, diversity, small scale, and dispersion.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a distributed control-based power collection apparatus and method for individually performing control in home and local areas where demand-side power supply resources may be managed, and for acquiring only the information needed to utilize resources, for a side utilizing the demand-side power supply resources.

In accordance with an aspect of the present invention, a method for collecting power from distributed power supply resources is provided. The method includes transmitting a signal for inquiring whether supply of demand-side power supply resources is possible to a providing side that provides demand-side power supply resources, selecting demand-side power supply resources to be utilized, based on power supply resource-related information for each of available demand-side power supply resources, which is received from the providing side, and notifying the selection results to the selected demand-side power supply resources.

In accordance with another aspect of the present invention, a method for providing power from distributed power supply resources is provided. The method includes, upon receiving from a utilizing side a signal for inquiring whether supply of demand-side power supply resources is possible, transmitting, to the utilizing side, power supply resource-related information for each of available demand-side power supply resources, and receiving, from the utilizing side, resulting information selected as demand-side power supply resources to be utilized.

In accordance with another aspect of the present invention, an apparatus for collecting power from distributed power supply resources is provided. The apparatus includes a transceiver for transmitting a signal for inquiring whether supply of demand-side power supply resources is possible to a providing side that provides demand-side power supply resources, and a controller for selecting demand-side power supply resources to be utilized, based on power supply resource-related information for each of available demand-side power supply resources, which is received from the providing side, and for controlling the transceiver to notify the selection results to the selected demand-side power supply resources.

In accordance with another aspect of the present invention, an apparatus for providing power from distributed power supply resources is provided. The apparatus includes a transceiver for, upon receiving from a utilizing side a signal for inquiring whether supply of demand-side power supply resources is possible, transmitting, to the utilizing side, power supply resource-related information for each of available demand-side power supply resources, and for receiving, from the utilizing side, resulting information selected as demand-side power supply resources to be utilized.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a power collection method according to an exemplary embodiment of the present invention, signals may be transmitted and received via a variety of wired/wireless communication networks, such as wired/wireless public networks, private networks, and short-range wireless communication networks (for example, Zigbee).

The demand-side supply resources collected in a power collection method according to an exemplary embodiment of the present invention control the demand-side power supply resources to reduce the power usage or to have a positive (+) value of supplying the stored power, if they lack power, or allow the demand-side power supply resources to have a negative (−) value by increasing the power usage if the power is oversupplied from the power system. In other words, collecting power in the demand-side power supply resources may include both the demand side's receiving power, and supplying more power to the demand side.

Figure 1:
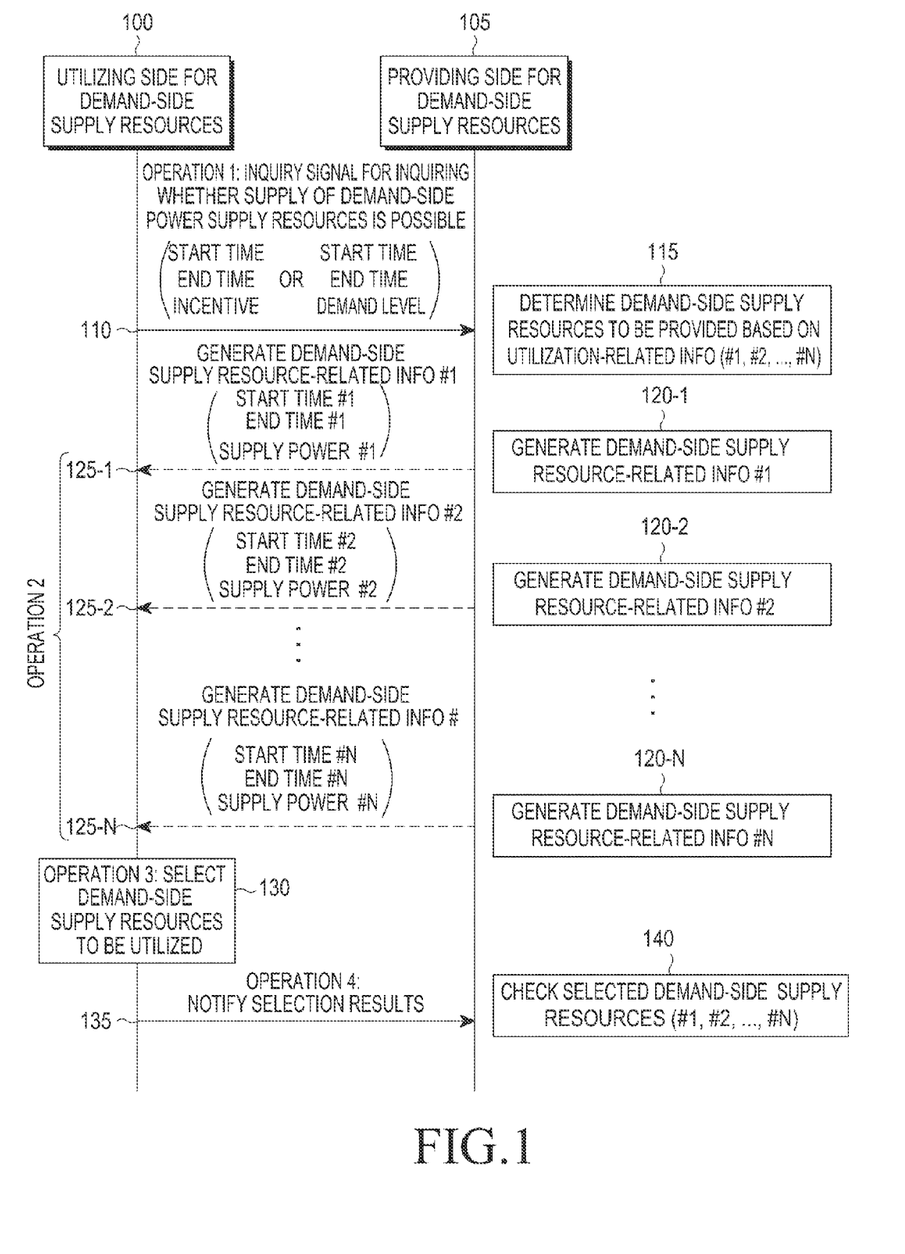
FIG. 1 illustrates a power collection method according to an exemplary embodiment of the present invention.

FIG. 1 illustrates a power collection method according to an exemplary embodiment of the present invention. Although not illustrated, the demand-side power supply resources that can be provided by a providing side 105 for demand-side supply resources may be stored in a Database (DB) of a power collection apparatus of the providing side 105, through a device registration procedure before operation 1.

Referring to FIG. 1, if there is a need to utilize the demand-side power supply resources, a utilizing side 100 for demand-side power supply resources may collect demand-side power supply resources by performing power collection for the providing side 105 for demand-side supply resources through the following operations 1 to 4, and utilize the collected resources. Although one providing side 105 is considered herein, it is to be understood that this is merely for convenience of description and it will be apparent to those of ordinary skill in the art that there may be a variety of distributed apparatuses capable of providing demand-side supply resources as described above.

In step 110 (operation 1), the utilizing side 100 sends to the providing side 105 an inquiry signal for inquiring whether supply of demand-side power supply resources is possible. The inquiry signal includes utilization-related information of the demand-side power supply resources. The utilization-related information includes, for example, information about the start time and end time for the time the demand-side power supply resources are required, and about an incentive or a demand level that can be provided during provision of the resources. The term 'incentive' as used herein may refer to the cost that the utilizing side 100 pays per unit of power supplied from the providing side 105. The larger the required amount of power, the larger the incentive. The term 'demand level' as used herein may refer to a value indicating the risk in matching the demand and supply of power, for the amount of power required by the utilizing side 100. The larger the demand level, the larger the difference between the demand and supply of power. Therefore, the larger the required amount of power, the larger the demand level. The incentive is determined in advance by a contractual relationship between the utilizing side 100 and the providing side 105. The incentive may be applied when the utilizing side 100 needs to pay a predetermined cost for the providing side 105. In addition, the demand level, a value determined by a trust relationship with the utilizing side 100, may be utilized when there is a need to provide the demand-side power supply resources without the payment of the cost from the utilizing side 100.

As a specific example, if there is a need for power of 10 MW from 1 PM to 2 PM on Dec. 20, 2012, the utilization-related information may include 'start time=2012/12/20/13:00:00' and 'end time=2012/12/20/14:00:00'. In addition, the utilization-related information may include '10 MW' as internal information, and information, for example, 'incentive=100 won/kWh' or 'demand level=3', which is converted depending on the predetermined incentive or demand level.

In step 115, the providing side 105 determines the demand-side supply resources it will provide, based on the utilization-related information. For example, it will be assumed that the total number of the determined demand-side supply resources is N, where N denotes an indicator of available demand-side supply resources. In steps 120-1 to 120-N, the providing side generates demand-side supply resource-related information #1 to #N for the available demand-side supply resources #1, #2, . . . , #N, respectively.

In steps 125-1 to 125-N (operation 2), the providing side 105 transmits the generated demand-side supply resource-related information #1 to #N to the utilization side 100. The demand-side supply resource-related information #1 includes, for example, parameters for start time #1 and end time #1 for the time the provision of the demand-side supply resource #1 is possible, and for supply power #1 indicating the amount of available power. Similarly, the demand-side supply resource-related information #2 to #N may also include the relevant parameter values.

For example, a solar generator in an area A, which is included in the providing side 105, may provide to the utilizing side 100 the demand-side supply resource-related information which is set as, for example, 'start time=2012/12/20/13:10:00', 'end time=2012/12/20/13:30:00' and 'supply power=3 kW'. In addition, a power storage apparatus in an area B, which is included in the providing side 105, may provide to the utilizing side 100 the demand-side supply resource-related information which is differently set as, for example, 'start time=2012/12/20/13:20:00', 'end time=2012/12/20/13:40:00' and 'supply power=5 kW'. In other words, different apparatuses included in the providing side 105 may provide demand-side supply resource-related information including parameters which are differently set. Values of the above-described parameters included in the demand-side supply resource-related information are the values, which the utilizing side 100 does not need to know, that are individually determined in the side managing the related resources by using the detailed information about the related apparatus.

Thereafter, the utilizing side 100 selects demand-side power supply resources based on the received demand-side supply resource-related information #1 to #N in step 130 (operation 3), and notifies the selection results in step 135 (operation 4). For example, it will be assumed that all the demand-side power supply resources #1 to #N are selected. The providing side 105 receives the selection results and checks the selected demand-side power supply resources in step 140.

As described above, the proposed process of selecting demand-side power supply resources by the utilizing side in operation 3 includes a process of selecting demand-side power supply resources capable of satisfying the utilization-related information required by the utilizing side, in the demand-side supply resource-related information that can be provided from the providing side. If there is a plurality of demand-side power supply resources satisfying the utilization-related information among the demand-side power supply resources that the providing side can provide, the demand-side power supply resources may be selected according to priority. For example, the priority may be applied by selecting at least one of three combinations or conditions comprised of and in order of a case where the amount of supply power has the maximum value, a case where the supply time has the longest time, and a case where the internally determined reliability priority is the highest, or in order of the maximum value of the amount of supply power, the longest time of the supply time, and the highest reliability priority.

The demand-side power supply resources, which are selected on the basis of the above-described priority, are combined to become demand-side power supply resources which are finally supplied to the utilizing side. As for the collected demand-side power supply resources, since a plurality of resources are utilized by being accumulated, the first demand-side power supply resources provided by the providing side do not need to completely match with the amount of power required by the utilizing side. For example, it will be assumed that the amount of power that the utilizing side requires from 1 PM to 2 PM on Dec. 20, 2012, is 10 MW. In this case, the amount of demand-side supply power that the providing side finally provides may be slightly higher or lower than 10 MW, and the demand-side supply power may be provided, for example, from 1:05 PM to 1:55 PM on Dec. 20, 2012, failing to completely match the start time and the end time and causing a slight difference in the supply time.

Figure 2:
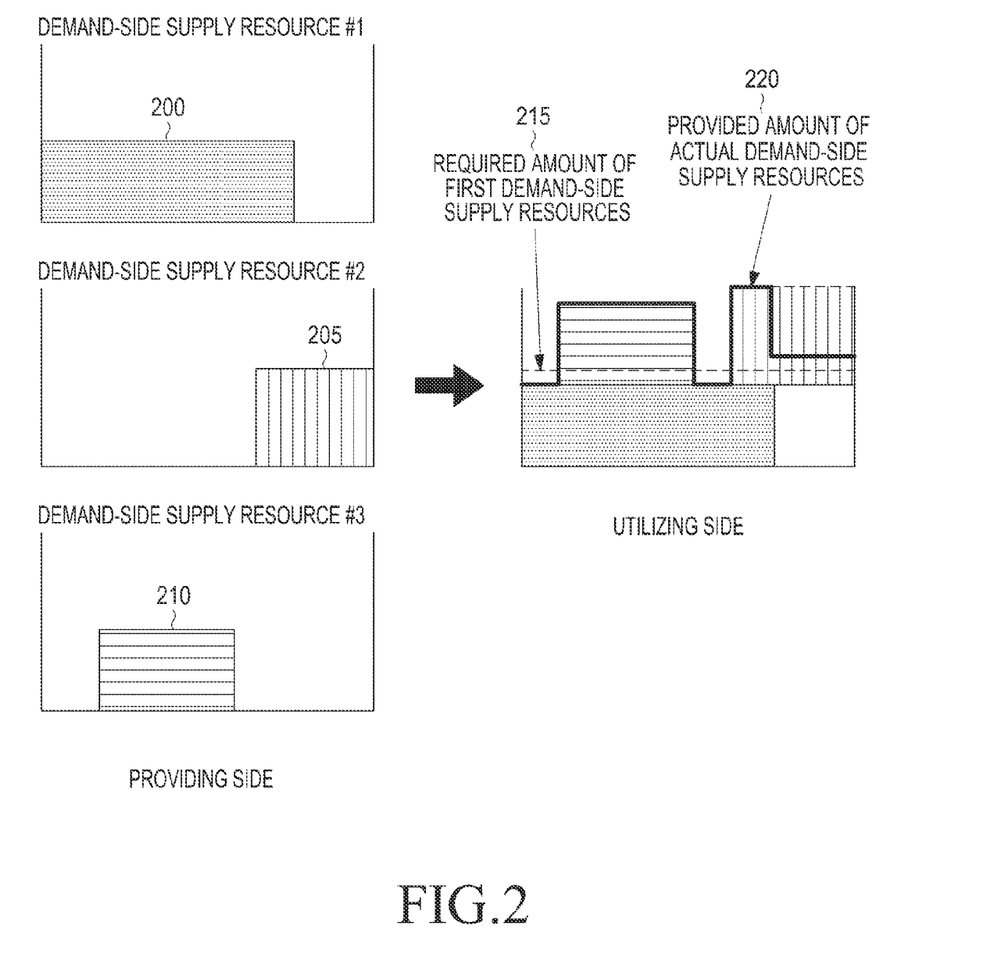
FIG. 2 illustrates an example of performing operation 3 by a utilizing side according to a first exemplary embodiment of the present invention.

FIG. 2 illustrates an example of performing operation 3 by a utilizing side according to a first exemplary embodiment of the present invention. It will be assumed that there is a difference between the amount of first demand-side supply resources required by the utilizing side and the amount of actual demand-side supply resources provided by the providing side.

Referring to FIG. 2, it will be assumed that the demand-side supply resources that can be provided by the providing side are, for example, demand-side supply resources #1 (200), #2 (205) and #3 (210). The demand-side supply resources #1 (200) to #3 (210) are different in the amount of resources. Accordingly, the amount of resources, which is determined by combining all the demand-side supply resources #1 (200) to #3 (210), may be compared with the demand level included in the utilization-related information that the utilizing side delvers to the providing side in step 110 of FIG. 1, i.e., with the amount 215 of the first demand-side supply resources that the utilizing side desires to receive from the providing side.

More specifically, as regards the secured amount of actual demand-side supply resources provided to the utilizing side, there are intervals where the secured amount of demand-side supply resources is slightly less than the required amount 215 of the first demand-side supply resources, and intervals where the secured amount of demand-side supply resources slightly or significantly exceeds the required amount 215 of the first demand-side supply resources.

As a result, if there are intervals (e.g., a, b, c, d and e) where there is a difference between the required amount 215 of the first demand-side supply resources and the provided amount 220 of actual demand-side supply resources, the utilizing side determines to accept the demand-side supply resources depending on whether the demand-side supply resources satisfy a predetermined permitted range for the difference, for example, a range that the amount of resources, which corresponds to a difference between the required amount of first demand-side supply resources and the provided amount of actual demand-side supply resources, i.e., the difference in the intervals a, b, c, d and e, is ±5% of the required amount of first demand-side supply resources. If the amount of resources, which corresponds to the difference, i.e., the difference in the intervals a, b, c, d and e, satisfies the permitted range, the utilizing side determines to accept the demand-side supply resources. However, if the amount of resources does not satisfy the permitted range, the utilizing side determines not to accept the demand-side supply resources.

Figure 3:
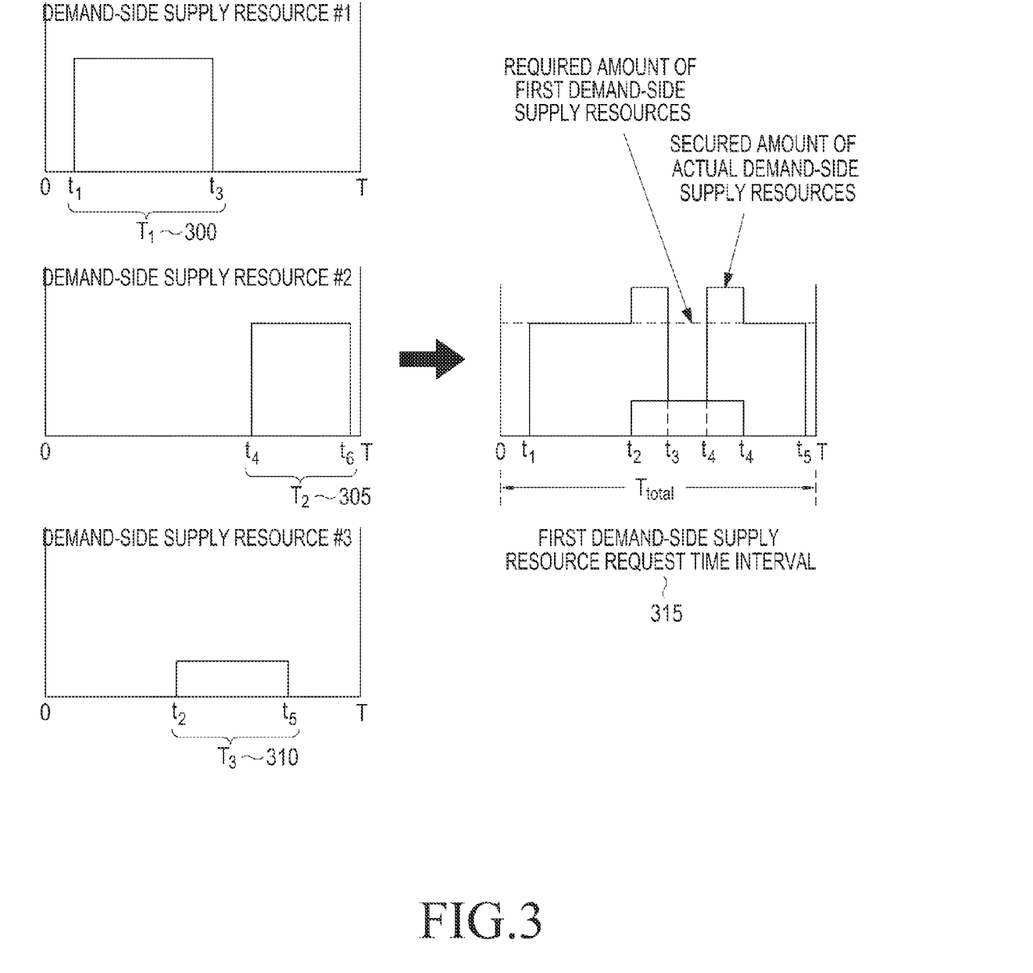
FIG. 3 illustrates another example of performing operation 3 by a utilizing side according to the first exemplary embodiment of the present invention.

FIG. 3 illustrates another example of performing operation 3 by a utilizing side according to the first exemplary embodiment of the present invention. It will be assumed that there is a difference between the time the utilizing side requires demand-side supply resources from the providing side, and the start time and end time the providing side provides the demand-side supply resources.

Referring to FIG. 3, it will be assumed that the demand-side supply resources that can be provided by the providing side are, for example, demand-side supply resources #1, #2 and #3. The demand-side supply resources #1 to #3 are provided in different time intervals. More specifically, the demand-side supply resources #1 are supplied in a time interval $T_1$ 300 comprised of a start time $t_1$ and an end time $t_3$, and the demand-side supply resources #2 are supplied in a time interval $T_2$ 305 comprised of a start time $t_4$ and an end time $t_6$. Finally, the demand-side supply resources #3 are supplied in a time interval $T_3$ 310 comprised of a start time $t_2$ and an end time $t_5$.

Accordingly, the total time interval, in which the demand-side supply resources #1 to #3 are provided, is comprised of the start time $t_1$ and the end time $t_6$. Compared with this, the first demand-side supply resource request time interval $T_{total}$ 315 that the utilizing side delivers to the providing side is comprised of, for example, a start time 0 and an end time T, which are delivered in the utilization-related information.

As a result, if there is a difference between the first demand-side supply resource request time interval and the total time interval in which the demand-side supply resources are actually provided, the utilizing side determines to accept the demand-side supply resources depending on whether the demand-side supply resources satisfy a predetermined permitted range for the difference between time intervals, for example, a range that a time different of each of the start time and the end time is ±5 minutes. If the difference, i.e., the time difference of each of the start time and the end time, satisfies the permitted range, the utilizing side determines to accept the demand-side supply resources. However, if the difference does not satisfy the permitted range, the utilizing side determines not to accept the demand-side supply resources.

The selection result notification that the utilizing side delivers to the providing side in operation 4 is a signal indicating the above-described results in operation 3. More specifically, using the selection result notification, the utilizing side delivers an instruction to provide the demand-side supply resources to the selected demand-side power supply resources depending on the included time information in the predetermined time. To this end, the selection result notification may be delivered by additionally including the demand-side supply resource-related information that the demand-side supply resources delivered in operation 2, thereby making it possible to prevent errors related to the supply time or power supply.

Although not illustrated in FIG. 1, if there are non-selected demand-side supply resources among the demand-side supply resources that transmitted demand-side supply resource-related information in operation 2, the utilizing side may transmit to the demand-side supply resources a signal instructing to disregard the inquiry signal it transmitted in operation 1.

If the utilizing side has failed to sufficiently secure the required demand-side power supply resources even though it has collected the demand-side supply resources through the above-described methods, the utilizing side needs to repeat the process of collecting demand-side supply resources, by raising at least one of the incentive and the demand level step by step. An example of this collection process includes a method of transmitting a signal for notifying non-selection of all the demand-side power supply resources by the utilizing side in operation 4, and of performing again the procedures of FIG. 1 beginning from operation 1 by raising at least one of the incentive and the demand level step by step. Alternatively, it is also possible to consider a method of repeating the collection process by additionally raising the incentive or the demand level step by step only for the insufficient power supply that the utilizing side failed to secure in the previous collection process.

As a specific example, it will be assumed that the total amount of supply power that the utilizing side will secure from the providing side is 10 MW. If it is assumed that the amount of supply power that the utilizing side has now secured with 'incentive=100 won/kWh' is 8 MW, the utilizing side may use a method of securing 10 MW gain from the beginning by raising the incentive to the next step or 'incentive=200 won/kWh', without selecting all of the secured 8 MW. Alternatively, if it is determined that it is possible that every resource has a difference incentive, the utilizing side may secure an additional amount of power by raising the incentive step to 'incentive=200 won/kWh' only for the insufficient power of 2 MW.

Figure 4:
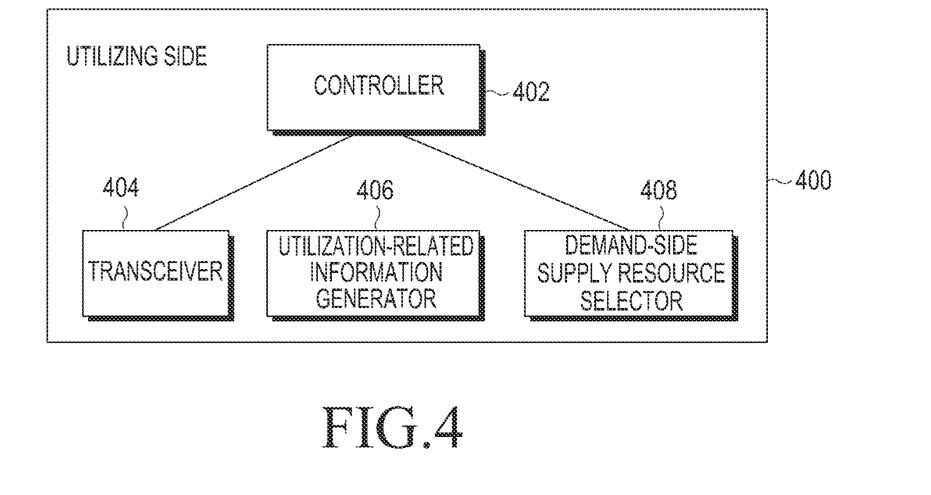
FIG. 4 illustrates a device structure of a utilizing side according to an exemplary embodiment of the present invention.

FIG. 4 illustrates a device structure of a utilizing side according to an exemplary embodiment of the present invention.

Referring to FIG. 4, a utilizing side 400 includes a controller 402, a transceiver 404, a utilization-related information generator 406, and a demand-side supply resource selector 408.

Upon recognizing the need for provision of demand-side supply resources, the controller 402 controls the utilization-related information generator 406 to generate utilization-related information of the required demand-side power resources in accordance with operation 1 of the power collection process. The utilization-related information generator 406 generates utilization-related information under control of the controller 402. The utilization-related information has been described in conjunction with operation 1 of FIG. 1.

The controller 402 controls the transceiver 404 to deliver to the providing side an inquiry signal which includes the utilization-related information and is used for inquiring whether supply of demand-side power supply resources is possible. Under control of the controller 402, the transceiver 404 transmits the inquiry signal.

Thereafter, upon recognizing the reception of demand-side supply resource-related information from the providing side through the transceiver 404, the controller 402 controls the demand-side supply resource selector 408 to select demand-side supply resources to utilize, based on the demand-side supply resource-related related information. Based on the demand-side supply resource-related information, the demand-side supply resource selector 408 selects demand-side supply resources satisfying the permitted range, taking into account the predetermined permitted range for the difference between the required amount of demand-side supply resources required by the utilizing side and the provided amount of demand-side supply resources, the time required for the demand-side supply resources required by the utilizing side, and the time difference between the times provided by the demand side, in accordance with the above-described situation of FIG. 2 or FIG. 3. The controller 402 controls the transceiver 404 to notify the selection results to the selected demand-side supply resources and notify the non-selection to the non-selected demand-side supply resources.

Figure 5:
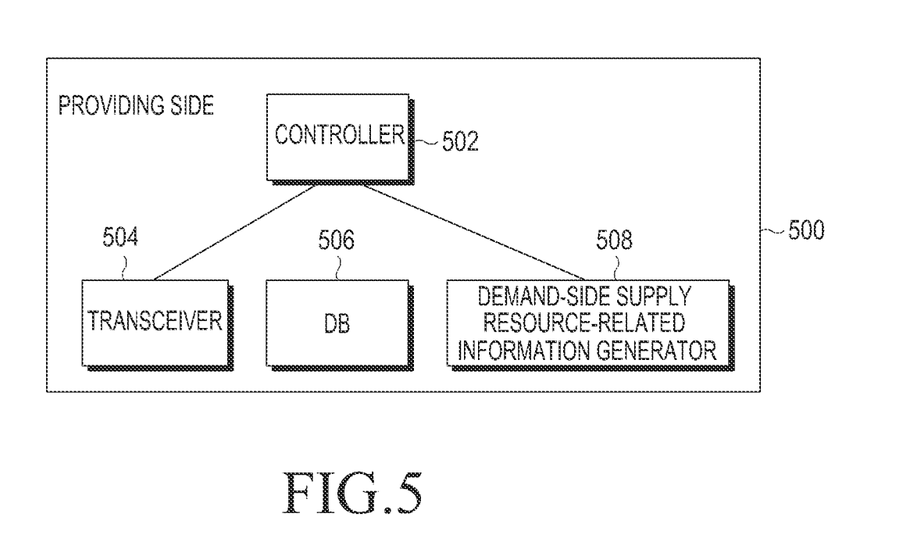
FIG. 5 illustrates a device structure of a providing side according to an exemplary embodiment of the present invention.

FIG. 5 illustrates a device structure of a providing side according to an exemplary embodiment of the present invention.

Referring to FIG. 5, a providing side 500 includes a controller 502, a transceiver 504, a DB 506, and a demand-side supply resource-related information generator 508.

The DB 506 manages demand-side power supply resources that the pre-registered providing side can provide. Upon determining that the transceiver 504 receives from the utilizing side an inquiry signal for inquiring whether supply of power supply resources is possible, the controller 502 acquires utilization-related information from the inquiry signal. Based on the utilization-related information, the controller 502 determines demand-side supply resources it will provide to the utilizing side. In addition, the controller 502 controls the demand-side supply resource-related information generator 508 to generate related information for each of the determined demand-side supply resources. The related information has been described in conjunction with operation 2.

Thereafter, the controller 502 receives the selection result notification or the information indicating non-selection for the demand-side supply resources selected by the utilizing side, through the transceiver 504, and determines whether the demand-side supply resources are selected, depending on the inquiry signal.

As is apparent from the foregoing description, exemplary embodiments of the present invention make it possible to utilize distributed demand-side power supply resources without the need to collect detailed information about each of various demand-side power supply resources from the distributed demand-side power supply apparatuses, and without performing direct control for a plurality of demand-side power supply resources, which is practically impossible.

In addition, exemplary embodiments of the present invention may provide the technical foundation in which the infrastructure of the power system may be utilized practically and effectively, when the environment, in which elements of the power system may exchange information over the wired/wireless communication network, is provided as a smart grid is built, and when many demand-side power supply resources are secured, which will be spread by continuous technology development and policy support, though they are not currently activated like the demand response resources, renewable energy resources, electricity storage apparatuses, and electric cars.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for collecting power from distributed second devices by a first device, the method comprising:
   transmitting, by the first device, to the distributed second devices, a power supply request comprising supply power information to be required;
   receiving, by the first device, from at least one of the distributed second devices, at least one supply power resource information determined based on the supply power information comprising at least one of a required time for a supply power to be required, a cost of the supply power to be paid to a power supply system, and a value indicating a level of disadvantage generated by mismatching the supply power;
   selecting, by the first device, a distributed second device from among the at least one distributed second device based on a supply time or an amount of respective supply powers included in the at least one supply power resource information, and a predetermined priority; and
   notifying, by the first device, the selection result to the selected distributed second device,
   wherein the first device receives the power to be supplied from the selected distributed second device.

2. The method of claim 1, wherein the required time for the supply power comprises at least one of a start time and an end time.

3. The method of claim 2, wherein each of the at least one of the start time and the end time, the cost, and the value is individually determined to be different for respective supply powers.

4. The method of claim 1, wherein the selecting of the distributed second device comprises selecting the supply power having a maximum value among amounts or supply times of the respective supply powers.

5. The method of claim 1, wherein, if a first amount or a first required time of a first supply power included in the supply power information is not matched to a second amount or a second supply time of a second supply power included in the at least one supply power resource information, and if the mismatched amount or the mismatched time is included within a permitted range, a resource of the second supply power is selected as the supply power resource to be utilized.

6. A method for providing a supply power by a second device, the method comprising:
   receiving, by the second device from a first device, a power supply request comprising supply power information to be required;
   determining, by the second device supply power resource information based on the supply power information comprising at least one of a required time for a supply power to be required, a cost of the supply power to be paid to a power supply system, and a value indicating a level of disadvantage generated by mismatching the supply power;
   transmitting, by the second device to the first device, the supply power resource information; and
   receiving, by the second device from the first device, a selecting result,
   wherein the supply power resource is selected based on a supply time or an amount of respective supply powers included in the at least one supply power resource information, and a predetermined priority, and
   wherein the second device supplies power to the first device.

7. The method of claim 6, wherein the required time for the supply power comprises at least one of a start time and an end time.

8. The method of claim 7, wherein each of the at least one of the start time and the end time, the cost, and the value is individually determined to be different for respective supply powers.

9. The method of claim 6, wherein if the determined supply power resource satisfies a condition that the supply power has a maximum value among amounts or supply times of the respective supply powers, the selecting result is received from the first device.

10. A first device for collecting power from distributed second devices, the first device comprising:
    a transmitter configured to transmit, to the distributed second devices, a power supply request comprising supply power information to be required;

a receiver configured to receive, from at least one of the distributed second devices, at least one supply power resource information determined based on the supply power information comprising at least one of a required time for a supply power to be required, a cost of the supply power to be paid by the first device, and a value indicating a level of disadvantage generated by mismatching the supply power; and a controller configured to select a distributed second device from among the at least one distributed second devices based on a supply time or an amount of respective supply powers included in the at least one supply power resource information, and a predetermined priority, and control the transmitter to notify the selection result to the selected distributed second device transmitting supply power resource information, wherein the first device receives the power to be supplied from the selected distributed second device.

11. The first device of claim 10, wherein the required time for the supply power to be required comprises at least one of the start time and the end time of power to be required by the utilizing side.

12. The first device of claim 11, wherein each of the at least one of the start time and the end time, the cost, and the value, can be individually determined to be different for respective supply powers.

13. The first device of claim 10, wherein the controller is configured to select the distributed second device satisfying a condition that a supply power has a maximum value among amounts or supply times of the respective supply powers.

14. The first device of claim 10, wherein, if a first amount or a first supply time of the required power included in the required power information is not matched to a second amount or a second supply time of a second supply power included in the at least one supply power resource information, and if the mismatched amount or the mismatched supply time is included within a permitted range, a resource of the second supply power is selected as the supply power resource to be utilized.

15. A second device for providing a supply power, the second device comprising:

a receiver configured to receive, from a first device, a power supply request comprising supply power information to be required, and receive, from the first device, a selecting result, where the supply power resource is selected based on a supply time or an amount of respective supply powers included in the at least one supply power resource information, and a predetermined priority;

a controller configured to determine the supply power resource information based on the supply power information comprising at least one of a required time for a supply power to be required, a cost of the supply power to be paid to a power supply system, and a value indicating a level of disadvantage generated by mismatching the supply power; and a transmitter configured to transmit, to the first device, the supply power resource information, wherein the second device supplies the power to the first device.

16. The second device of claim 15, wherein the required time for the supply power comprises at least one of a start time and end time.

17. The second device of claim 16, wherein each of the at least one of the start time and the end time, the cost, and the value is individually determined to be different for respective the supply powers.

18. The second device of claim 15, wherein if the determined supply power resource satisfies a condition that a supply power has a maximum value among amounts or supply times of the respective supply powers, the selecting result is received from the first device.

19. The method of claim 6, wherein, if a first amount or a first required time of a first supply power included in the supply power information, is not matched to a second amount or a second supply time of a second supply power included in the at least one supply power resource information and if the mismatched amount or the mismatched time included within a permitted range, a resource of the second supply power is selected as the supply power resource to be utilized.

20. The second device of claim 15, wherein if a first amount or a first required time of a first supply power included in the supply power information, is not matched to a second amount or a second supply time of a second supply power included in the at least one supply power resource information and if the mismatched amount or the mismatched time included within a permitted range, a resource of the second supply power is selected as the supply power resource to be utilized.

* * * * *